May 22, 1956  W. E. KOCK  2,747,184
WAVE REFRACTING DEVICES
Filed June 23, 1950  4 Sheets-Sheet 1

INVENTOR
W. E. KOCK
BY Franklin Mohr
ATTORNEY

May 22, 1956  W. E. KOCK  2,747,184
WAVE REFRACTING DEVICES
Filed June 23, 1950  4 Sheets-Sheet 2

TOP SECTIONAL VIEW OF LENS 70

SIDE VIEW OF LENS 70

FRONT VIEW OF LENS 70

INVENTOR
W. E. KOCK
BY
Franklin Mohr
ATTORNEY

May 22, 1956 W. E. KOCK 2,747,184
WAVE REFRACTING DEVICES
Filed June 23, 1950 4 Sheets-Sheet 3
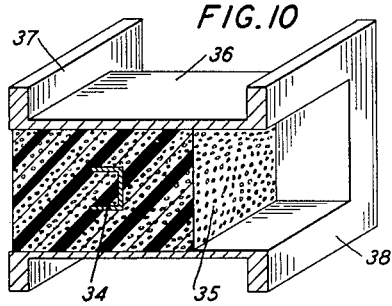
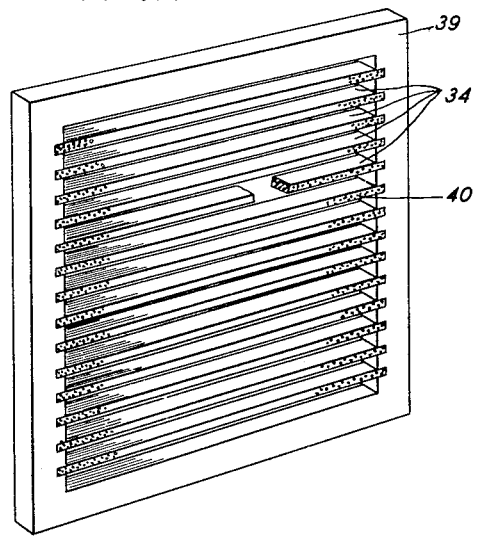
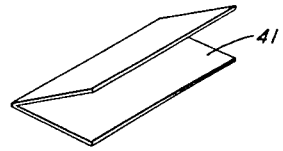
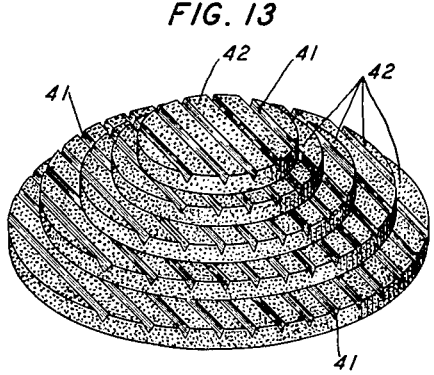
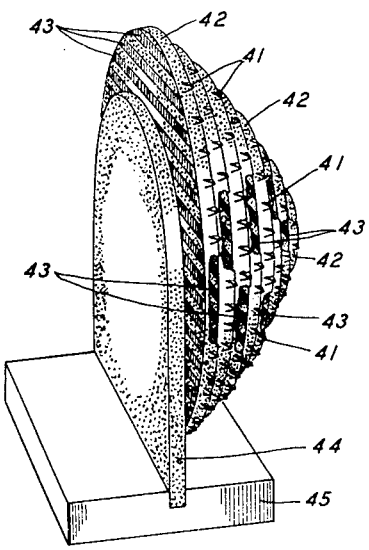
INVENTOR
W. E. KOCK
BY
Franklin Mohr
ATTORNEY May 22, 1956   W. E. KOCK   2,747,184
WAVE REFRACTING DEVICES
Filed June 23, 1950   4 Sheets-Sheet 4

INVENTOR
W. E. KOCK
BY
Franklin Mohr
ATTORNEY

United States Patent Office 2,747,184
Patented May 22, 1956

2,747,184

WAVE REFRACTING DEVICES

Winston E. Kock, Basking Ridge, N. J., assignor to Bell Telephone Laboratories, Incorporated, New York, N. Y., a corporation of New York Application June 23, 1950, Serial No. 169,968

20 Claims. (Cl. 343—909)

This invention relates to refracting devices for waves of various kinds, including electromagnetic and compressional, and more particularly, in the case of electromagnetic waves, to devices employing artificial media possessing an effective permeability and to the combination of such media with artificial dielectric media.

The fabrication and use of artificial dielectric media for electromagnetic waves has been described in my copending application Serial No. 748,447, filed May 16, 1947, Patent No. 2,579,324, December 18, 1951, in which conductive elements such as metallic spheres or discs are arranged in a three-dimensional array analogous to the molecular lattice of a crystalline dielectric. There is an electric polarization engendered in such an array of elements by an electromagnetic wave that is equivalent in many respects to the polarization of a natural dielectric medium.

There are known to the art arrays of conductive elements which produce an effective permeability and may be characterized as constituting an artificial magnetic medium.

In accordance with the present invention artificial refractive media of various sorts including improved forms thereof disclosed hereinafter are employed in making refracting devices for waves, elastic or electromagnetic. In the electromagnetic case, combinations of artificial dielectric media with artificial magnetic media are used to produce compound artificial refractive media in which boundary reflections are materially reduced or substantially prevented.

In particular, the use of artificial permeability in combination with an artificial dielectric yields a refractive medium having the same impedance as free space but having a lower velocity of propagation for electromagnetic waves. Because the impedances of free space and this compound refractive medium are the same, reflections at the surface are substantially eliminated.

In the case of compressional waves, acoustic waves, elastic waves and the like, rigid elements take the place of the conductive elements in the arrays and the resulting media are useful in the delay and refraction of the particular kind of waves for which the device is designed.

A satisfactory theory of artificial refractive media may be based upon the lumped element circuit equivalents of certain structures associated with hollow pipe wave guides, from which a generalization leads to the consideration of arrays of elements in free space.

In the accompanying drawings,

Fig. 9 is a perspective view of a channel-like element useful in practicing the invention;

Fig. 10 is a perspective view of a section of hollow pipe wave guide containing a channel element like that of Fig. 9 embedded in a filling of dielectric material such as polystyrene foam;

Fig. 11 is a perspective view, partly in section, showing an array of channels in a frame;

Fig. 12 is a perspective view of a V-shaped element useful as an alternative to the channel-like element of Fig. 9;

Fig. 13 is a perspective view of a plano-convex lens constructed of V-shaped elements as shown in Fig. 12 embedded in discs of dielectric material such as polystyrene foam;

Fig. 14 is a perspective view of a lens similar to that of Fig. 13 but embodying strip elements as shown in Fig. 5 in addition to V-shaped elements as shown in Fig. 13;

Figure 1:
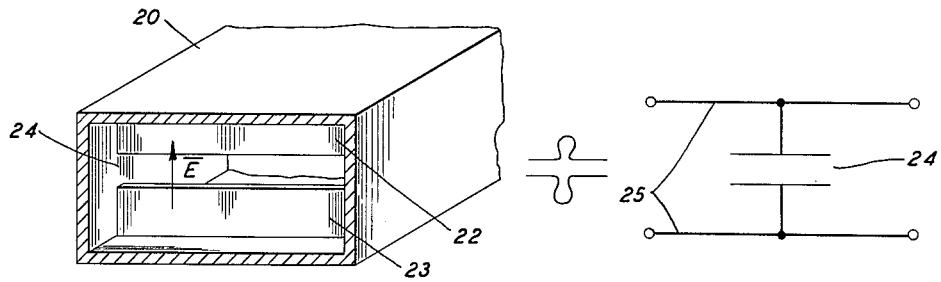
Fig. 1 is a perspective view of a section of hollow pipe wave guide with barrier plates defining a slot perpendicular to the direction of the electric vector, together with a diagrammatic representation of the equivalent lumped circuit element corresponding to the slot, namely a capacitance.

Referring to Fig. 1, there is shown a section of rectangular hollow pipe dielectric wave guide 20 with the longer dimension of the rectangular section shown horizontal. It is assumed that an electromagnetic wave to be propagated through the guide has its electric vector E oriented vertically as shown in the figure. Upper and lower barrier plates 22 and 23 respectively having conductive surfaces are shown defining a slot 24 which has its principal direction perpendicular both to the direction of the vector E and to the longitudinal axis of the guide. A slot oriented like the slot 24 is known to function in the guide like a shunt capacitance in a conventional transmission line, and the lumped element circuit equivalent of the structure is shown diagrammatically at the right in the figure by a shunt condenser 24 in a conventional line 25. Thus, a metallic constriction or iris in a hollow pipe dielectric wave guide, oriented as in Fig. 1, is the equivalent in many respects of a capacitive shunt in a two-wire transmission line.

Figure 2:
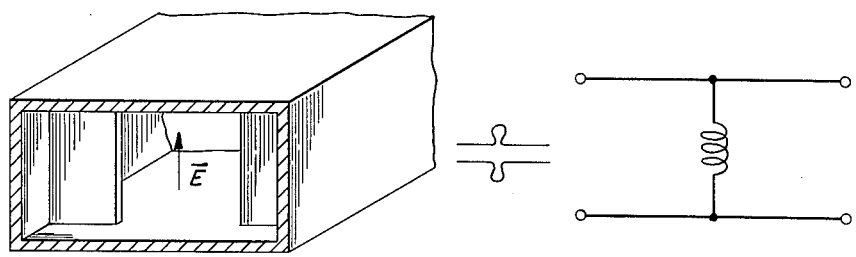
Fig. 2 is a similar representation except that the slot is parallel to the electric vector and the equivalent lumped circuit element is a shunt inductance.

Fig. 2 shows a metallic constriction or iris oriented at right angles to that in Fig. 1 with reference to the vector E. This arrangement is known to be equivalent to a shunt inductance in a two-wire line, as indicated diagrammatically at the right in the figure.

Figure 3:
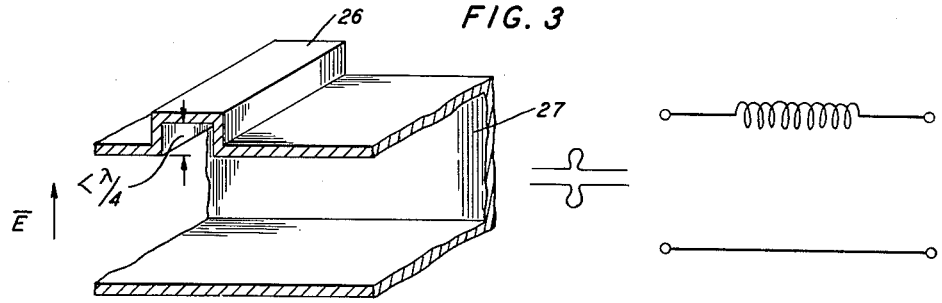
Fig. 3 is a perspective view of a section of hollow pipe wave guide having a channel-like extension in one wall and a series inductance as the equivalent lumped circuit element.

Fig. 3 shows a channel-like cavity structure 26 in the top wall of a rectangular wave guide 27, the channel having a depth in the direction of the electric vector somewhat less than a quarter wavelength at the desired operating frequency. This arrangement is known to produce the equivalent of a series inductance in a conventional transmission line.

Figure 4:
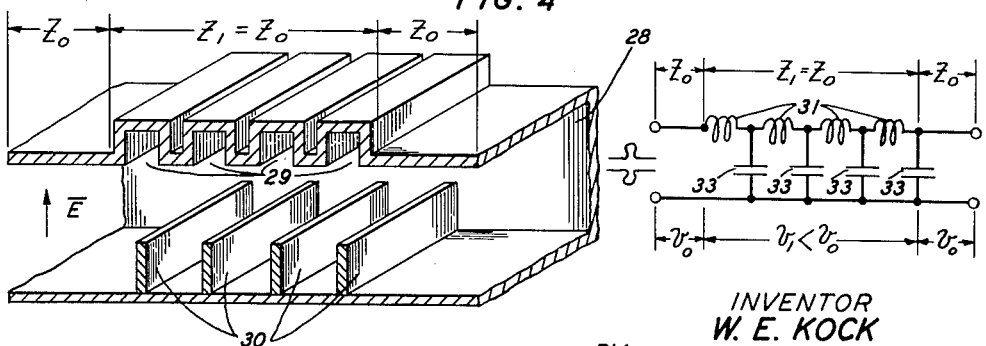
Fig. 4 is a perspective view of a section of hollow pipe wave guide having barrier plates arranged as in the lower part of Fig. 1 together with a plurality of channel-like extensions like that in Fig. 3 and having an equivalent lumped circuit which is a low-pass filter.

Fig. 4 shows a rectangular wave guide 28 in which a plurality of cavity structures 29 similar to the structure 26 in Fig. 3 are provided together with a plurality of shunt capacitive structures 30 similar to the lower barrier plate 23 in Fig. 1. The structure of Fig. 4 is found to have as its lumped element circuit equivalent the circuit shown at the right in the figure, the series inductances 31 corresponding to the channel-like cavity structures 29 and the shunt capacitances 33 corresponding to the constrictions formed by the barrier plates 30. The structure of Fig. 4 is thus equivalent to a loaded transmission line having series inductances and shunt capacitances, i. e., a low-pass filter. Such a line can readily be designed to have its characteristic impedance equal to the characteristic impedance of the unloaded line and therefore can be connected into an unloaded line of the same construction without material impedance mismatch. Moreover, because of the presence of the series and shunt elements in the loaded section the velocity of wave propagation in that section can be made materially smaller than that of the unloaded line.

More particularly, the shunt capacitance per unit length in the loaded section may be adjusted to compensate, in its effect upon the characteristic impedance, for the series inductance per unit length, while not compensating in its effect upon the velocity of propagation, analogously with lumped constant circuit theory. Thus, if $L_0$ is the series inductance per unit length and $C_0$ the shunt capacitance per unit length in the unloaded line, and $L_1$ and $C_1$ respectively are the added series inductance and added shunt capacitance per unit length in the loaded section, the characteristic impedance $Z_0$ of the unloaded line is $$Z_0 = \sqrt{\frac{L_0}{C_0}} \qquad (1)$$

while the characteristic impedance $Z_1$ of the loaded section is $$Z_1 = \sqrt{\frac{L_0 + L_1}{C_0 + C_1}} \qquad (2)$$

By so proportioning $L_1$ and $C_1$ that $$\frac{L_0}{C_0} = \frac{L_0 + L_1}{C_0 + C_1} \qquad (3)$$

it is seen that $$Z_1 = Z_0 \qquad (4)$$

when $$\frac{L_1}{C_1} = \frac{L_0}{C_0} = Z_0^2 \qquad (5)$$

The velocity of propagation $v_0$ for the unloaded line on the other hand is $$v_0 = \frac{1}{\sqrt{L_0 C_0}} \qquad (6)$$

while the velocity $v_1$ for the loaded section is $$v_1 = \frac{1}{\sqrt{(L_0 + L_1)(C_0 + C_1)}} \qquad (7)$$

By comparison of Equations 6 and 7 it is seen by inspection that positive values of $L_1$ and $C_1$ result in $$v_1 < v_0 \qquad (8)$$

that is, the velocity of propagation in the loaded section is less than that in the unloaded line.

It should be noted that at higher frequencies, other modes of transmission, not possible at lower frequencies occur and the velocity of propagation for such modes may be greater than the velocity of propagation in the unloaded line.

Image formation in the top, bottom and side walls of the guide 28 in Fig. 4 transforms the loaded guide into the equivalent of a refractive medium of infinite extent consisting of arrays of channel-like cavity structures combined with arrays of conductive barrier strips. When the inductances and capacitances are proportioned as specified by Equation 3, the resulting medium is refractive to electromagnetic waves and at the same time introduces no reflection loss at the boundary between the unloaded medium and the loaded medium. In other words, since the wave impedance of the loaded medium is equal to the wave impedance of the unloaded medium (or free space), there is no reflection loss to a wave passing across the boundary between the two media. The propagation velocity in the loaded medium, however, is different from that in free space, so that lenses, prisms, etc., may be constructed from the loaded medium which are capable of focusing, diffusing or otherwise refracting electromagnetic waves of suitable wavelength, with substantially no attendant reflection loss.

The right-hand portion of Fig. 4 indicates diagrammatically the impedances of the loaded and unloaded line and the velocity of propagation in each.

Figs. 5, 6, 7 and 8 show a lens structure employing capacitive elements alone without combining inductive elements, as disclosed in my copending application Serial No. 748,448, filed May 16, 1947, Patent No. 2,577,619, December 4, 1951. This structure is repeated here to illustrate one type of capacitive medium which may be modified in accordance with the present invention to produce a non-reflective refracting structure.

Referring to Figs. 5, 6, 7 and 8, reference numeral 70 denotes a unipolarized, circularly symmetrical, metallic delay lens comprising an array 71 of forty-nine conductive strip members 3 spaced apart a distance $S_y$ along the Y dimension, and a distance $S_z$ along the Z dimension, of a polystyrene foam medium 32. The forty-nine strips 3 are arranged in seven vertical panels 72 to 78 or, stated differently, in eight horizontal tiers 79 to 86. The foam medium 32 comprises eight vertically stacked slabs 87 to 94 which contain vertical slots for retaining the strips 3 and support, respectively, the eight tiers 79 to 86. Numerals 95, 96, 97 and 98 denote, respectively, the front plane face, the back convex face, the optical axis and the point focus of the lens 70. As shown on the drawing, the lengths of the slots and the strips 3, and the depths of certain outer slots and the widths of the corresponding outer strips, are selected so as to conform to the convex contour of the back face 96 of the lens. Accordingly, while the number N of strips per unit area of the YZ section is constant throughout the array 71, the array includes fractional, as well as whole strips. Numeral 99 denotes a conical, point-type horn having its throat orifice positioned at the focal point 98 and connected by the dielectric guide 100 to a translation device 101.

Figure 5:
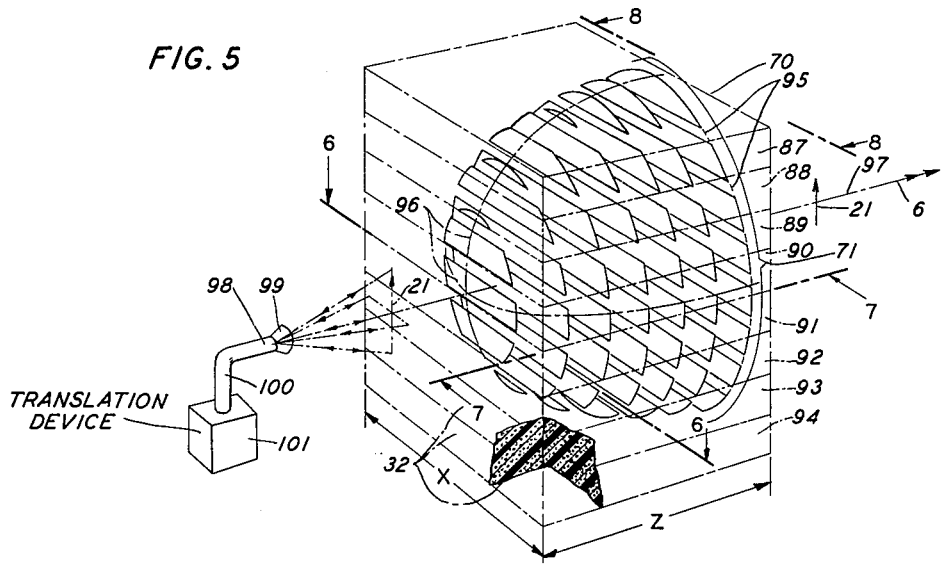
Fig. 5 is a perspective view of a point beam antenna system comprising a plano-convex, circularly symmetrical, strip lens.
Figure 6:
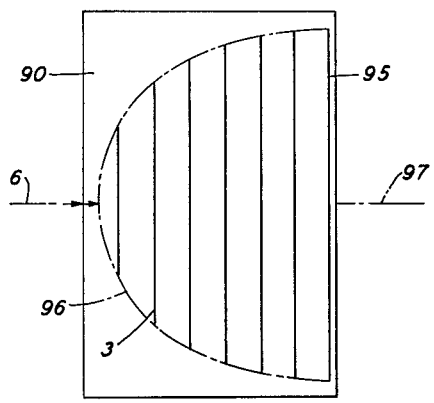
Figs. 6, 7 and 8 are, respectively, top sectional, side and front views of the lens included in the system of Fig. 5.
Figure 7:
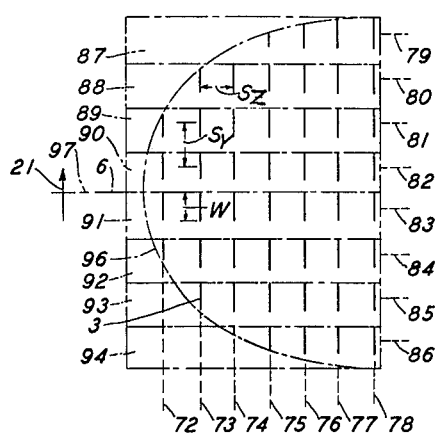
Figure 8:
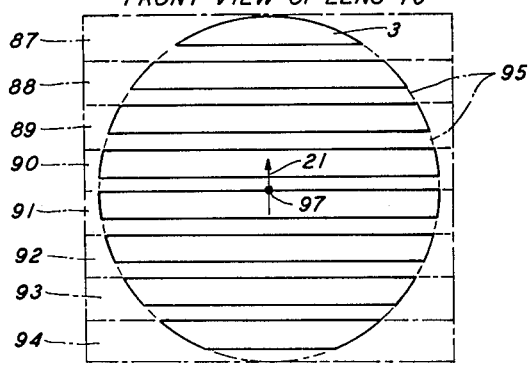

In the operation of the system of Fig. 5, assuming the device 101 is a transmitter, energy is supplied by the transmitter 101 over guide 100 to the horn 99 and a wave having a vertical polarization 21 (electric vector) and a spherical wave front, is propagated towards the lens 70. The phases of the wavelets passing through the thick central or vertex portion of the lens are retarded a greater amount than the phases of the wavelets propagated through the outer thinner lens portion, and the wavelets arriving at the flat front face 95 are rendered cophasal. Stated differently, the outgoing spherical wave front is converted by the lens 70 to a plane wave front extending perpendicularly to the axis 97. In reception, the converse operation is obtained, and an incoming plane wave front having a propagation direction parallel to the axis 97 is transformed by the positive plano-convex lens 70 into a spherical wave front converging on the focus 98. Inasmuch as the lens 70 is circularly symmetrical, focusing action is obtained in all planes containing the axis 97.

Fig. 9 shows a channel-like conductive element which may be used in accordance with the invention to serve as the equivalent of a series inductance either in a hollow pipe wave guide or in free space. The element 34 may be made of sheet metal of any desired thickness or it may be made of metal foil, in which case it may be stiff enough to be self-supporting or it may be thin enough to require external support. In either case it should be thick enough substantially to prevent penetration of the wave from one surface of the foil to the other.

Fig. 10 shows the element 34 embedded in a filling 35 of dielectric material, e. g. polystyrene foam, inside a section of rectangular hollow pipe wave guide 36. Mounting flanges 37, 38 are shown for use in inserting the section 36 in a system of similar wave guides, either loaded or unloaded. Section 36 is thus inductively loaded and is filled, in effect, with an artificial inductive or magnetic medium comprising the channel element 34 and the polystyrene foam 35, the latter being shown partly cut away in the figure. Internal wave reflections in the walls of the wave guide 36 serve to produce in effect a magnetic medium of infinite extent filling all space. The structure of Fig. 10 has been found to be substantially the equivalent of that of Fig. 3.

Fig. 11 shows a two-dimensional array of elements 34 in free space surrounded by a frame 39 and each element 34 having a supporting rectangular core 40 of polystyrene foam which is in turned supported by the frame 39. The element 34 in this case may be of thin metal foil which requires external support such as is given by the foam material. The array of metallic channels acts for free space waves as the equivalent of a single series inductance just as a single channel element in an enclosed wave guide acts as a single series inductive element for waves confined within the wave guide. The shape of the channel element may be varied somewhat and may be U-shaped or V-shaped, for example.

Fig. 12 shows a V-shaped channel member 41 which performs substantially the same function as the member 34.

Fig. 13 shows a three-dimensional array of V-shaped members 41 supported by circular slabs 42 of polystyrene foam, the combination approximately filling the space of and conforming to the shape of a plano-convex lens. The lens is the substantial equivalent of one which might be made from a material having a permeability materially different from that of air or free space, an example of such being a material known by the trade name of "ferroxcube" and having a permeability greater than unity for electromagnetic waves. The velocity of propagation of the waves in a permeable medium depends upon the relation $$\frac{v_0}{v_1} = \sqrt{\mu_r \epsilon_r} \quad (9)$$

where $v_0$ is the velocity of waves in free space, $v_1$ is the velocity of waves in the permeable medium, $\mu_r$ the relative permeability of the medium and $\epsilon_r$ the relative dielectric constant of the medium. Equation 9 indicates that a medium with effective permeability greater than unity will slow down electromagnetic waves and it follows that a convex lens made of the permeable medium will cause a focusing of such waves. A lens built as shown in Fig. 13 was tested by means of electromagnetic microwaves and found to perform as expected, that is, in a manner similar in its focusing effect to an artificial dielectric lens built as shown in Figs. 5 to 8, inclusive, and described in my copending application Serial No. 748,448, filed May 16, 1947, Patent No. 2,577,619, December 4, 1951. The slabs 42 in the structure shown in Fig. 13 may be fastened together by any suitable means, e. g. with acetate cement, adhesive tape, etc.

Fig. 14 shows another plano-convex lens for electromagnetic waves, in this case comprising a combination medium having both artificial permeability and artificial dielectric constant. As in the structure shown in Fig. 13, the structure of Fig. 14 is built up from circular slabs 42 of polystyrene foam in which are embedded V-shaped conductive elements 41. In addition, each slab has attached to one of its flat surfaces a plurality of spaced conductive strips 43 which impart the desired dielectric constant to the composite artificial medium. The slabs 42 are fastened together in the approximate geometrical form of a lens and may be attached to a standard or back plate 44 of polystyrene foam which in turn may be supported by an insulating base plate 45. The V-shaped elements 41 impart the artificial magnetic effect the same as in the structure of Fig. 13, it being possible to secure equivalent effects whether the points of the V's are oriented toward the planar face of the lens as in Fig. 13 or toward the convex face as in Fig. 14.

A lens constructed as in Fig. 14 has been found to focus electromagnetic waves in the expected manner and whereas either medium (dielectric or magnetic) by itself would produce strong reflections from the surfaces of the respective lens, the combination shown in Fig. 14 was found to operate with only negligible reflections from the surfaces.

Figure 15:
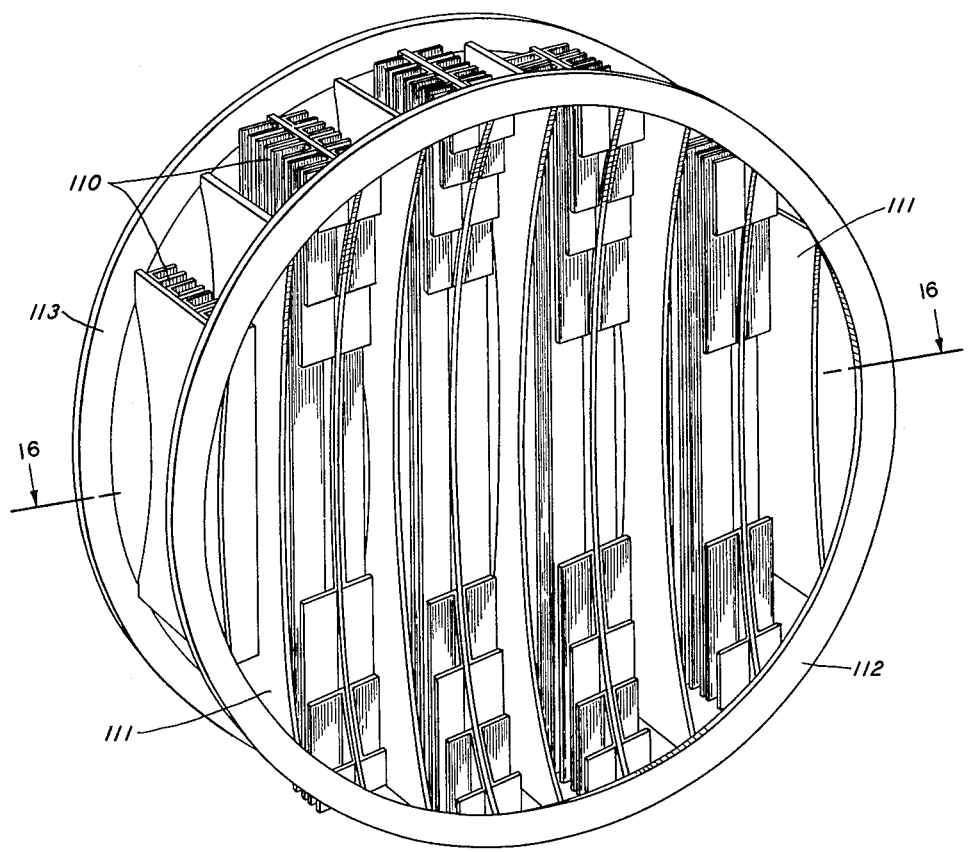
Fig. 15 is a perspective view of a double concave refracting structure employing wave guides somewhat like that shown in Fig. 3, operated in a mode of transmission in which waves are accelerated rather than delayed and hence providing a structure which converges or focuses waves passing therethrough.
Figure 16:
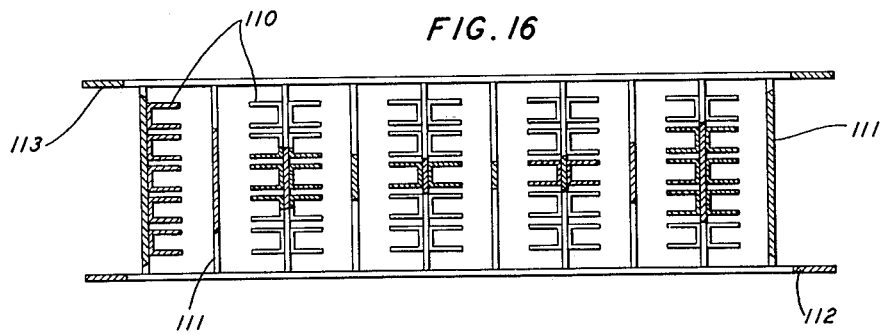
Fig. 16 is a view of the structure of Fig. 15 as sectioned upon a medial horizontal plane.

Figs. 15 and 16 show a converging lens of the phase-acceleration type designed for use with certain modes of transmission. The lens is composed of an array of channel members 110 or other corrugated structure alternating with smooth plates 111. The members 110 and plates 111 are supported in any suitable manner, as by rings 112 and 113 and form an artificial transmission medium. The volume of space occupied by the medium is in the shape and form of a double-concave lens. On account of the fact that this structure accelerates the phase of a wave entering it, the properties of a concave lens in this medium are like those of a convex lens made of a medium in which the phase of a wave is retarded.

The structure of Figs. 15 and 16 is operative particularly with waves in which the modes of transmission are of higher order than the simplest fundamental or dominant waves.

Such of the structures shown which do not depend for their operation upon properties peculiar to electromagnetic waves as distinguished from compressional waves may be used with either type of wave. Only the structure of Fig. 2 is in fact not adaptable to strictly analogous use with either wave type. It is to be understood, of course, that a structure for use with compressional waves requires the necessary mechanical rigidity to reflect compressional waves from its surfaces and has no need of electrical conductivity, whereas the same or any other structure for use with electromagnetic waves requires the necessary surface conductivity and requires mechanical rigidity only to the extent that its parts be maintained in the desired positions relatively one to another. It is known, of course, that some modes of transmission which are possible in the case of compressional waves are not possible in the case of electromagnetic waves, and vice versa for some other modes of transmission.

It is to be noted, moreover, that at the resonant frequencies of any structure standing waves appear instead of traveling waves and absorption of energy and filtering action occurs. It is also possible at some frequencies to propagate waves in more than one mode either alone or simultaneously, which wave appearing depending in some instances upon the direction from which the resonant frequency is approached as the frequency is varied in the neighborhood of the resonant frequency.

Structures comprising cavity resonators operated at or near resonance to provide filtering action are disclosed and claimed in my copending application Serial No. 169,967, filed June 23, 1950, Patent 2,701,617, issued February 8, 1955.

What is claimed is:

1. A reactive device for electromagnetic waves, comprising a plurality of spaced parallel bars of dielectric material distributed over an area transverse to the path of the waves, and a plurality of channel-shaped members of metal foil each supported by a respective one of said dielectric bars.

2. A wave velocity modifying device for waves of radiant energy comprising, in a bounded region of an initially non-loaded medium for the transmission of said waves, a plurality of recessed members positioned within said bounded region, each said recessed member being composed of a material capable of reflecting said waves, said recessed members being separated from each other by portions of the initially non-loaded medium, which portions are interconnected for the transmission of said waves through the said bounded region, the recess in each said recessed member having a depth that is a substantial fraction of a wavelength and materially less than a quarter wavelength of said waves, and said recessed members being uniformly distributed over an area transverse to the direction of propagation of the waves.

3. A wave velocity modifying device for waves of radiant energy in a given frequency range, comprising, in a bounded region of an initially non-loaded medium for the transmission of said waves, a plurality of cavity resonators positioned within said bounded region, each said resonator being composed of a material capable of reflecting said waves, said resonators being separated from each other by portions of the initially non-loaded medium, which portions are interconnected for the transmission of said waves through the said bounded region, each said resonator having a fundamental resonance at a frequency in the neighborhood of said given frequency range and materially higher than the highest frequency in said range, and said resonators being uniformly distributed over an area transverse to the direction of propagation of the waves.

4. A device in accordance with claim 3, in which each said cavity resonator has a coupling aperture exposed to the waves to be delayed.

5. A device in accordance with claim 2, in which one cross section of said device transverse to the direction of propagation of said waves is different in size than another such cross section at a point separated from said one cross section.

6. A device in accordance with claim 2, in which at least one boundary of the said bounded region is a substantially convex surface.

7. A device in accordance with claim 2, in which at least one boundary of the said bounded region is a substantially concave surface.

8. A device in accordance with claim 2, in which the initially non-loaded medium is polystyrene foam.

9. A device in accordance with claim 2, for electromagnetic waves, in which the initially non-loaded medium is polystyrene foam and in which the recessed members are composed of metal foil and are supported by the polystyrene foam.

10. A lens for waves of radiant energy comprising a plurality of slabs of a first material that is in itself a medium for transmission of said waves, each of said slabs supporting a plurality of recessed members that are capable of reflecting said waves, said recessed members being separated from each other, the recess in each member having a depth that is a substantial fraction of a wavelength and less than a quarter wavelength of said waves, and said slabs being of different areas and mounted along a common axis substantially normal to the principal surfaces of the respective slabs.

11. A lens for waves of radiant energy comprising a plurality of discs of a first material that is in itself a medium for transmission of said waves, each of said discs supporting a plurality of recessed members that are composed of a second material capable of reflecting said waves, said recessed members being separated from each other, the recess in each member having a depth that is a substantial fraction of a wavelength of said waves, and said discs being of graduated diameters and mounted coaxially.

12. A lens in accordance with claim 11, in which the material of the discs is polystyrene foam.

13. A lens in accordance with claim 11, for electromagnetic waves, in which the material of the discs is a dielectric material.

14. A lens in accordance with claim 13, in which the recessed members are channel-shaped members of metal foil each supported by the dielectric material of the discs.

15. A lens in accordance with claim 13, in which the dielectric material is polystyrene foam.

16. A lens in accordance with claim 11, in which the recessed members are interspersed with flat strip members of the second material, whereby the resultant effective characteristic impedance of the lens for said waves may be given a desired value.

17. A lens in accordance with claim 16, for electromagnetic waves in which the material of the slabs is polystyrene foam, the recessed members are conductive members of V-shaped cross section and the flat strip members are conductive.

18. A lens for waves of radiant energy comprising, in a bounded region of an initially non-loaded medium for the transmission of said waves, a substantially homogeneous loaded medium having a cross section substantially larger than the wavelength of said waves, said loaded medium comprising a plurality of channel-shaped elements arranged in a spaced parallel array and positioned within said bounded region, each channel-shaped element being composed of a material capable of reflecting said waves, and the boundaries of said bounded region being of substantially the same shape as the respective boundaries of a specific type of optical lens.

19. A lens according to claim 18, for electromagnetic waves, in which the initially non-loaded medium is a solid dielectric material comprising discs of different diameter to conform approximately to the shape of the lens and the channel-shaped elements are composed of conductive material supported by the discs.

20. A wave velocity modifying device for waves of radiant energy comprising, in a bounded region of an initially non-loaded medium for the transmission of said waves, a plurality of channel-shaped elements arranged in a spaced parallel array and a plurality of strip elements in another spaced parallel array, a two-dimensional subarray of said strip element being interposed between two adjacent two-dimensional subarrays of channel-shaped elements, said channel-shaped elements and said strip elements each being composed of a material capable of reflecting said waves.

References Cited in the file of this patent

UNITED STATES PATENTS

| Number | Name | Date |
|---|---|---|
| 1,804,884 | Mazer | May 12, 1931 |
| 1,954,516 | Bourne | Apr. 10, 1934 |
| 2,395,560 | Llewellyn | Feb. 26, 1946 |
| 2,412,713 | Burt | Dec. 17, 1946 |
| 2,415,352 | Iams | Feb. 4, 1947 |
| 2,508,479 | Wheeler | May 23, 1950 |
| 2,528,582 | De Vore | Nov. 7, 1950 |
| 2,530,580 | Lindenblad | Nov. 21, 1950 |
| 2,548,672 | Lewis | Apr. 10, 1951 |
| 2,567,748 | White | Sept. 11, 1951 |